(12) United States Patent
Suzuki et al.

(10) Patent No.: US 6,498,200 B1
(45) Date of Patent: Dec. 24, 2002

(54) CATIONICALLY POLYMERIZABLE RESIN COMPOSITION

(75) Inventors: Osamu Suzuki, Niigata (JP); Haruyuki Yoshii, Niigata (JP); Hisao Kondo, Niigata (JP); Kenichi Suzuki, Niigata (JP)

(73) Assignee: Namics Corporation, Niigata (JP)

( * ) Notice: Subject to any disclaimer, the term of this patent is extended or adjusted under 35 U.S.C. 154(b) by 0 days.

(21) Appl. No.: 09/480,424

(22) Filed: Jan. 11, 2000

(30) Foreign Application Priority Data

Jan. 12, 1999 (JP) .............................. 11-005149

(51) Int. Cl.⁷ ............................ C08K 3/22; C08K 3/26; C08K 3/36; C08K 5/14; C08G 63/00
(52) U.S. Cl. ............................ 522/13; 522/15; 522/24; 522/25; 522/63; 522/71; 522/83; 522/168; 522/170; 523/300; 524/413; 524/425; 524/430; 524/432; 524/433; 524/464; 524/786; 524/789; 524/779; 524/788
(58) Field of Search ............................... 522/83, 24, 25, 522/13, 15, 168, 170, 71, 63; 523/300; 524/779–788, 425, 432, 433, 413, 430

(56) References Cited

U.S. PATENT DOCUMENTS

| | | | | |
|---|---|---|---|---|
| 4,069,055 A | * | 1/1978 | Crivello |
| 4,230,814 A | * | 10/1980 | Crivello |
| 4,479,990 A | * | 10/1984 | Dixon et al. |
| 5,750,590 A | * | 5/1998 | Schaefer et al. |
| 6,245,827 B1 | * | 6/2001 | Gregory |

* cited by examiner

*Primary Examiner*—Susan W. Berman
(74) *Attorney, Agent, or Firm*—Frishauf, Holtz, Goodman & Chick, P.C.

(57) ABSTRACT

A cationically polymerizable resin composition which comprises (A) a compound containing at least one ring selected from the group consisting of an oxirane ring and an oxetane ring; (B) an onium salt; (C) an organic peroxide; and (D) an alkaline filler except for a hydroxide.

15 Claims, No Drawings

CATIONICALLY POLYMERIZABLE RESIN COMPOSITION

BACKGROUND OF THE INVENTION

1. Field of the Invention

The present invention relates to a resin composition which cures by cationic polymerization, more specifically, to a resin composition which is useful for an encapsulating agent of a semiconductor, an electric insulating material, a sealing agent or a binder. The present invention also relates to a semiconductor package encapsulated by the resin composition and a circuit board mounted thereon such a semiconductor.

2. Prior Art

An epoxy compound or an oxetane compound have an oxygen-containing ring structure and cured to form a resinous polymer in the presence of a curing agent and/or a curing catalyst under heating or irradiation of light by utilizing their reactivity, and have been widely used as an encapsulating agent of a semiconductor or an electric insulating material.

As a curing agent of these compounds, a method of using a phenol-novolak compound has been known, but in this method, the reaction rate is relatively slow. Also, in the method an amino compound such as a polyamine or an acid anhydride compound such as pyromellitic anhydride is used.

It has been known that an oxirane compound or an oxetane compound is subjected to heat polymerization or photopolymerization by using a cationic polymerization catalyst. In the reaction system in which such a polymerization catalyst is formulated is stable at normal temperature and a high reaction rate can be obtained by heating or photoirradiation so that it has been attracted attention as a latent catalyst. As an onium salt, there has been generally used an iodonium salt, a sulfonium salt, a phosphonium salt, etc.

The onium salt is an acidic substance, and when a cured resin obtained by using the same is subjected to humidity resistance test, an extracted liquid shows an acidic property. This is because an onium salt remained in the resin after curing is liberated from the resin in the presence of moisture, and thus, when such a resin is used for encapsulation or electric insulation of electronic parts, the electronic parts or parts in the vicinity thereof are corroded or defected.

On the other hand, if an alkaline substance such as an amine, etc. is used in a composition containing an oxirane compound or an oxetane compound and an onium compound in combination to neutralize the acidic substance, cationic species of the onium salt are broken so that deactivation of a catalyst and inhibition of curing based thereon are generated.

Also, when such an onium salt is used as a curing catalyst, a high reaction rate can be obtained. However, in these days, it has been earnestly desired to develop a reaction system which provides a high reaction rate by using an onium salt catalyst which does not cause large effect on hygiene and environment.

SUMMARY OF THE INVENTION

An object of the present invention is to solve the conventional problems and to provide a cationically polymerizable resin composition which causes no curing obstruction, cures rapidly, excellent in preservation stability and does not cause increase in electroconductivity of an extracted water or corrosion.

The present inventors have earnestly studied to accomplish the above objects and as a result, they have found that the above objects can be accomplished by using an oxirane ring and/or an oxetane ring-containing compound in combination with a cationically polymerizable catalyst and an organic peroxide, and further using an alkaline filler as at least a part of a filler.

That is, the present invention relates to a cationically polymerizable resin composition which comprises (A) a compound containing at least one ring selected from the group consisting of an oxirane ring and an oxetane ring;

(B) an onium salt;

(C) an organic peroxide; and (D) an alkaline filler except for a hydroxide.

DESCRIPTION OF THE PREFERRED EMBODIMENT

Component (A) to be used in the present invention is a compound having at least one oxirane ring and/or oxetane ring, and it may be a single species or two or more of mixtures. It is particularly preferred that Component (A) itself is a liquid at normal temperature, or Component (A) which is a solid at normal temperature is dissolved by a solvent or used in combination with a liquid state compound containing an oxirane ring to show a liquid state as a whole at normal temperature since it is easy in encapsulating operation or formation. It is more preferred that Component itself is a liquid state at normal temperature. Incidentally, a liquid state at normal temperature herein mentioned means a material which show fluidity at 25 to 40° C.

As a compound having an oxirane ring, there may be used a low molecular weight or high molecular weight compound having more than two oxirane rings in the molecule which is generally so-called an epoxy resin, a reactive diluent having one or more oxirane ring in the molecule and a silane compound or a siloxane compound each having an oxirane ring in the molecule. As the epoxy resin, there may be exemplified by a bisphenol A type epoxy resin, a brominated bisphenol A type epoxy resin, a bisphenol F type epoxy resin, a novolak type epoxy resin, an alicyclic epoxy resin, a biphenyl type epoxy resin, an ether type or a polyether type epoxy resin, an oxirane ring-containing polybutadiene, a silicone epoxy copolymerized resin, etc.

As an epoxy resin which is a liquid state at normal temperature, there may be mentioned a bisphenol A type epoxy resin having an average molecular weight of about 400 or less; a branched polyfunctional bisphenol A type epoxy resin such as p-glycidylphenyldimethyltolyl bisphenol A glycidyl ether represented by the following formula:

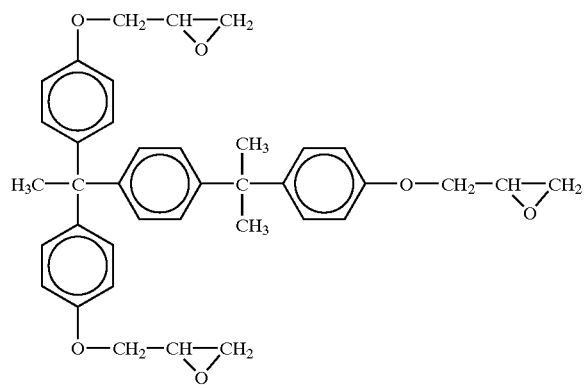

a bisphenol F type epoxy resin; a phenol novolak type epoxy resin having an average molecular weight of about 570 or less; alicyclic epoxy resin such as vinyl(3,4-cyclohexene) dioxide(3,4-epoxycyclohexyl)methyl 3,4-epoxycyclohexylcarboxylate, bis(3,4-epoxy-6-methylcyclohexyl-methyl)adipate, 2-(3,4-epoxycyclohexyl) 5,1-spiro(3,4-epoxycyclohexyl)-m-dioxane, etc.; a glycidyl ester type epoxy resin such as diglycidyl hexahydrophthalate, diglycidyl 3-methylhexahydrophthalate, diglycidyl hexahydroterephthalate, etc.; a glycidyl amine type epoxy resin such as diglycidylaniline, diglycidyltoluidine, triglycidyl-p-aminophenol, tetraglycidyl-m-xylylene diamine, tetraglycidylbis(aminomethyl)cyclohexane, etc.; and a hydantoin type epoxy resin such as 1,3-diglycidyl-5-methyl-5-ethylhydantoin, etc., and an alicyclic epoxy resin is preferred since high curing rate can be obtained.

Also, an epoxy resin which is a solid or having a super high viscosity at normal temperature may be used in combination with the epoxy resin which is a liquid state at normal temperature. Such an epoxy resin may be exemplified by a bisphenol A type epoxy resin with a high nmolecular weight, diglycidyl biphenyl, a novolak epoxy resin, a tetrabromo bisphenol A type epoxy resin, etc.

The reactive diluent is a compound having one or more oxirane rings in the molecule and having a relatively low viscosity at normal temperature, and depending on the purpose, it may have other polymerizable functional groups than the oxirane ring, such as an alkenyl group including vinyl, allyl, etc.; or an unsaturated carboxylic acid residue including acryloyl, methacrylol, etc. As the reactive diluent as mentioned above, there may be exemplified by a monoepoxide compound such as n-butyl glycidyl ether, 2-ethylhexyl glycidyl ether, phenyl glycidyl ether, cresyl glycidyl ether, p-s-butylphenyl glycidyl ether, styrene oxide, α-pinene oxide, etc.; a monoepoxide having other functional groups such as allyl glycidyl ether, glycidyl methacrylate, 1-vinyl-3,4-epoxycyclohexane, etc.; a diepoxide compound such as (poly)ethyleneglycol diglycidyl ether, (poly) propyleneglycol diglycidyl ether, butanediol glycidyl ether, neopentylglycol diglycidyl ether, etc.; and a triepoxide compound such as trimethylolpropane triglycidyl ether, glycerin triglycidyl ether, etc.

As the silane compound having an oxirane ring, there may be exemplified by 3-glycidoxypropyl trimethoxysilane, 3-glycidoxypropyl(methyl)dimethoxy silane, 2-(3,4-epoxycyclohexyl)ethyltrimethoxy silane, 2-(3,4-epoxycyclohexyl)ethyl(methyl)dimethoxy silane, etc. The silane compound is used by formulating a small amount based on the other Component (A) in order to improve adhesiveness particularly to the substrate.

As the siloxane compound having an oxirane compound, there may be exemplified by, in addition to 1,3-bis(3-glycidoxypropyl)-1,1,3,3-tetramethyldisiloxane, a straight siloxane oligomer having a 3-glycidoxypropyl group similarly at the terminal thereof. The siloxane compound is used by formulating a small amount based on the other Component (A) in order to provide flexibility, impact resistance, heat resistance, adhesiveness to an inorganic base material, etc.

As the oxetane-containing compound, there may be exemplified by a monooxetane compound such as 3-ethyl-3-hydroxymethyloxetane, 3-ethyl-3-hexyloxymethyloxetane, 3-ethyl-3-allyloxymethyloxetane, 3-ethyl-3-benzyloxymethyloxetane, 3-ethyl-3-methacryloxymethyloxetane, 3-ethyl-3-carboxyloxetane, etc.; a dioxetane compound such as bis-{[ethyl(3-oxetanyl)] methyl}ether, 1,4-bis[ethyl(3-oxetanyl)methoxymethyl] benzene, bis{[ethyl(3-oxetanyl)]-methyl}carbonate, bis{ [ethyl(3-oxetanyl)]ethyl}adipate, bis{[ethyl(3-oxetanyl)] methyl}terephthalate, bis{[ethyl(3-oxetanyl)]methyl}-1,4-cyclohexanecarboxylate, bis{4-[ethyl(3-oxetanyl) methoxycarbonylamino]phenyl}methane, α,ω-bis-{3-[1-ethyl(3-oxetanyl)methoxy]propyl(polydimethylsiloxane), etc.; and a polyoxetane compound such as oligo (glycidyloxetane-co-phenyl glycidyl ether), etc. Among these, 1,4-bis[ethyl(3-oxetanyl)methoxymethyl]-benzene is preferred since it has a low viscosity so that it is easily handled and shows high reactivity.

In the present invention, by using one or more of Component (A), a glass transition point of a cured product obtained by curing the composition can be optionally changed in the range of 70 to 200° C.

It is preferred to use 20 to 80% by weight of an aliphatic epoxy resin and 20 to 80% by weight of an oxetane ring-containing compound in combination since it is cured at low temperature and short time of heating, and shows an excellent film strength, and more preferred is that each of which is contained in 40 to 60% by weight, respectively. Also, for the uses which require particularly adhesiveness, a bisphenol A type, a branched polyfunctional bisphenol A type or a bisphenol F type epoxy resin is further used in combination with the above components.

Component (B) to be used in the present invention is an onium salt which functions as a cationic polymerization catalyst for curing the composition by making Component (A) network structure which is formed by subjecting to ring opening of the oxirane ring and/or oxetane ring in component (A) by heating or photoirradiation. The onium salt can be used by formulating it in the composition as a latent catalyst, and can cure the composition within a short time by heating and/or photoirradiation.

The onium salt is typically an iodonium salt, a sulfonium salt, an ammonium salt, a phosphonium salt, a diazonium salt or a pyridinium salt represented by the following formula:

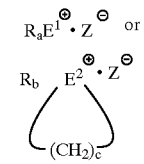

wherein

R may be the same or different from each other and represents an unsubstituted or substituted monovalent hydrocarbon group;

$E^1$ represents an iodine atom, a sulfur atom, a nitrogen atom, a phosphorus atom, a diazo group or an unsubstituted or ring-substituted pyridinio group;

$E^2$ represents a sulfur atom or a nitrogen atom;

Z represents a zwitter ion which is $BF_4$, $PF_4$, $AsF_6$, $SbF_6$ or $(C_6H_5)_4B$;

a is 2 when $E^1$ is an iodine atom, 3 when $E^1$ is a sulfur atom, 4 when $E^1$ is a nitrogen atom or a phosphorous atom, or 1 when $E^1$ is a diazo group or an unsubstituted or ring-substituted pyridinio group; b is 1 when $E^2$ is a sulfur atom or 2 when $E^2$ is a nitrogen atom;

c is an integer of 4 or 5, and they may be used singly or in combination of two or more.

As R, there may be exemplified by a straight or branched alkyl group having 1 to 15 carbon atoms such as methyl, ethyl, propyl, butyl, pentyl, octyl, decyl, dodecyl, tetradecyl, etc.; a cycloalkyl group having 3 to 10 carbon atoms such as cyclohexyl, etc., which may be substituted by an alkyl group having 1 to 15 carbon atoms as mentioned above; an aryl group having 6 to 20 carbon atoms such as phenyl, 4-tolyl, 2,4-xylyl, 1-naphthyl, etc.; an aralkyl group having 7 to 20 carbon atoms such as benzyl, 2-methylbenyl, 4-methylbenzyl, 2-phenylethyl, 1-naphthylmethyl, etc.; an alkenyl group having 2 to 10 carbon atoms such as vinyl, allyl, butenyl, etc.; and a monovalent substituted hydrocarbon group such as 4-hydroxyphenyl, 4-methoxyphenyl, 4-ethoxyphenyl, 4-cyanophenyl, 4-chlorophenyl, 4-acetoxyphenyl, 4-propanoylphenyl, 4-methoxycarbonylphenyl, 4-ethoxycarbonylphenyl, 4-methoxybenzyl, 4-ethoxybenzyl, 4-t-butoxybenzyl, 4-nitrobenzyl, 4-cyanobenzyl, etc. Of these, it is preferred that at least one of R's in the molecule is an aryl group or an aralkyl group, more preferably all R's are such a group since such a compound shows excellent curability.

$E^1$ is as described above, and as the unsubstituted or ring-substituted pyridinio group, there may be exemplified by, in addition to the pyridinio group, a ring-substituted pyridinium group such as 2- or 4-methylpyridinio, 2,4-dimethylpyridinio, 2- or 4-cyanopyridinio, 2- or 4-methoxycarbonylpyridinio, 2- or 4-ethoxycarbonylpyridinio, etc. As $E^1$ or $E^2$, an iodine atom or a sulfur atom is preferred since excellent curing rate can be obtained.

Z is as described above, and $SbF_6$ or $B(C_6H_5)_4$ is preferred since excellent curability is shown by heating or photoirradiation within a short period of time, and $B(C_6H_5)_4$ is particularly preferred since it shows no toxicity whereby it is needless to consider effects on hygiene and environment.

Such a preferred onium salt, there may be exemplified by a hexafluoroantimonate or a tetrakis(pentafluorophenyl) boron salt including a diaryl iodonium such as diphenyl iodonium, phenyl(4-tolyl)iodonium, phenyl(4-cumyl) iodonium, phenyl(4-t-butylphenyl)iodonium, di(4-tolyl) iodonium, 4-tolyl(4-cumyl)iodonium, 4-tolyl(4-t-butylphenyl)iodonium, di(4-cumyl)iodonium, 4-cumyl(4-t-butylphenyl)iodonium, di(4-t-butylphenyl)iodonium, etc.; a substituted aryl group-containing iodonium such as phenyl (4-methoxyphenyl)iodonium, bis(4-methoxyphenyl) iodonium, etc.; an aralkyl group-containing iodonium such as phenylbenzyl iodonium, etc.; triaryl sulfonium such as triphenyl sulfonium, diphenyl(4-t-butylphenyl)sulfonium, tritolyl sulfonium, etc.; a substituted aryl group-containing sulfonium such as tris(4-hydroxyphenyl)sulfonium, tris(4-methoxyphenyl)sulfonium, tris(4-ethoxyphenyl)sulfonium, tris(acetoxyphenyl)sulfonium, etc.; a benzyl structure-containing sulfonium such as methyl(4-hydroxyphenyl) benzyl sulfonium, methyl(4-methoxyphenyl)-1-naphthylmethyl sulfonium, etc. Of these, tetrakis (pentafluorophenyl)boron salt is preferred in the view points of hygiene and environment maintenance, and tetrakis (pentafluorophenyl)boron salt is particularly preferred since a suitable curing rate can be obtained. When it is used particularly in combination with Component (C), the composition can be extremely cured within a short period of time so that the diaryl iodonium tetrakis(pentafluorophenyl)boron salt is particularly preferred.

A formulation amount of Component (B) may vary depending on the conditions of the composition to be used and the kinds of Component (A) and Component (B), but it is generally 0.5 to 10 parts by weight, preferably 2 to 8 parts by weight based on 100 parts by weight of Component (A) since stability of the system at an uncured state is good, suitably curing rate can be obtained and a cured encapsulation layer having excellent physical property can be obtained.

Component (C) to be used in the present invention has an effect of promoting the function of Component (B) as a cationic polymerization catalyst, particularly when Component (B), above all a $B(C_6H_5)_4$ salt is used as a heat polymerization or a photopolymerization catalyst in combination with Component (C), the composition shows excellent effects that polymerization time can be shortened or an irradiation dose can be reduced.

As Component (C), there may be exemplified by a dialkyl peroxide, a peroxy ketal, a peroxy ester, a peroxy carbonate and a diacyl peroxide. Of these, a dialkyl peroxide, a peroxy ketal or an alkyl peroxy ester is preferred since a suitable decomposition temperature can be obtained, and more preferably those having a half decade temperature within the range of 60 to 130° C.

A preferred Component (C) may be exemplified by a dialkyl peroxide such as dicumyl peroxide, t-butylcumyl peroxide, 1,3-bis(2-t-butylperoxyisopropyl)benzene, 2,5-dimethyl-2,5-bis(t-butylperoxy)hexane, etc.; a peroxy ketal such as 1,1-bis(t-butylperoxy)cyclohexane, 1,1-bis(t-butylperoxy)-3,3,5-trimethylcyclohexane, 1,1-bis(t-amylperoxy)cyclohexane, 2,2-bis(t-butylperoxy)butane, n-butyl 4,4-bis(t-butylperoxy)valerate, ethyl 3,3-(t-butylperoxy)butyrate, etc.; an alkylperoxy ester such as t-butylperoxy-2-ethyl hexanoate, 1,1,3,3-tetramethylbutyl peroxy 2-ethylhexanoate, t-butylperoxy isobutyrate, t-butylperoxy maleate, t-butylperoxy benzoate, etc. These may be formulated as a pure product or a highly pure product, or may be used, depending on necessity, by dispersing or dissolving in a hydrocarbon, dimethyl phthalate, dioctyl phthalate, etc., or adsorbing to an inorganic fine powder such as calcium carbonate.

A formulation amount of Component (C) is preferably 0.01 to 1 part by weight, more preferably 0.03 to 0.3 part by weight based on 100 parts by weight of Component (A) since curing reaction can be proceeded with good control, and the curing reaction can be rapidly carried out or can be completed with a low temperature heating.

Component (D) to be used in the present invention is an alkaline filler for neutralizing an acid generated by the radical decomposition reaction which is generated depending on the kinds of Component (B) and Component (C) remained after the curing reaction. According to the findings by the present inventors', when other alkaline substance such as a hydroxide including magnesium hydroxide, potassium hydroxide, etc. or an amine is previously formulated to subject to the neutralization reaction, (B) the onium salt is decomposed to inhibit its catalytic activity, but by formulating an alkaline filler such as Component (D), an acidic substance remained after curing can be removed without inhibiting catalytic activity of (B) the onium salt.

Here, the alkaline filler means a filler in which an extract solution extracted with pure water according to the following conditions shows a pH of 7 or more, typically 7 to 10. That is, 1 g of the sample is added to 20 ml of pure water and the mixture is stirred at normal temperature for 1 minute, and a probe of a pH meter is dipped in the extract, then the pH of the mixture after allowing to stand is measured. Provided that even when the above-mentioned conditions are satisfied, a hydroxide having an anionic hydroxyl group in the molecule such as magnesium hydroxide, potassium hydroxide, etc. are excluded therefrom by the reason as mentioned above. Incidentally, an inorganic filler such as an oxide or a carbonate generally has a hydroxyl group on the surface thereof, and such hydroxyl groups existing on the solid surface do not cause any effects on the catalyst activity of the onium salt. Particle size and shape of the particles of Component (D) are not particularly limited.

As such Component (D), preferred are calcium carbonate, magnesium oxide and zinc oxide, and among silicon dioxide, titanium oxide and aluminum oxide, those in which an extract of which shows an alkaline property can be used. Component (D) may be used singly or in combination of two or more.

A formulation amount of Component (D) is generally 2 to 50-fold amount, preferably 5 to 15-fold amount based on the formulation amount of Component (B) to control the effects of Component (B) remained after oxidation.

The composition of the present invention is preferably a cationic polymerizable resin composition comprising
(A) 100 parts by weight of a compound having an oxirane ring and/or an oxetane ring;
(B) 2 to 8 parts by weight of an onium salt;
(C) 0.01 to 1 part by weight of an organic peroxide; and
(D) 5 to 15-fold amount of an alkaline filler except for a hydroxide based on the amount of Component (B).

In the present invention, a neutral or alkaline colorant may be formulated as Component (E) so as to not inhibit the function of Component (D). As the neutral or alkaline colorant, a colorant having a pH of the extract extracted by pure water in the same manner as mentioned above of 6 or more, typically 6 to 10. As the colorant mentioned above, there may be mentioned, for example, in addition to a black-colored pigment such as carbon black, black lead oxide, Cr—Cu complex oxide, a complex oxide of Cu—Fe—Mn; a colored inorganic colorant such as red iron oxide, cobalt blue, etc.; and an organic pigment such as a chromophthal type, a quinacridone type or a phthalocyanine type pigment, and these colorants may be used singly or in combination of two or more. Of these, those having a light-shielding effect dark color are preferred, and carbon black is particularly preferred.

A formulation amount of Component (E) is preferably 0.1 to 10 parts by weight based on 100 parts by weight of Component (A).

Into the composition of the present invention, a filler other than Component (D) may be formulated within the range which does not obscure the characteristics of the present invention. Such a filler may exemplified by, in addition to silicon dioxide, titanium oxide and aluminum oxide other than those which show an alkaline property; silicon nitride, boron nitride, etc., which can be added in an amount within the range in which the filler itself does not become an acidic including Component (D).

When a solid material is used as Component (A), whole Component (A) may be made a liquid state by using the above-mentioned reactive diluent, but depending on necessity, non-reactive diluent may be used. Also, Component (B) or Component (C) may be formulated by diluting them, or an apparent viscosity of the composition may be controlled by using a solvent to carry out operation smoothly depending on the uses of the composition. As such a non-reactive diluent or a solvent, there may be mentioned a high boiling point aromatic hydrocarbon such as p-cymene, tetraline, etc.; a ketone such as methyl ethyl ketone, methyl isobutyl ketone, etc.; an ether alcohol such as ethylene glycol monobutyl ether, diethylene glycol monobutyl ether, etc.; an ether ester of the above such as acetic acid ester, etc.; an ester such as dibutyl phthalate, dioctyl phthalate, etc.

Moreover, into the composition of the present invention, an inorganic fiber, a flame retardant, an ion trapping agent, an inner releasing agent, a sensitizer, etc. Also, in order to improve adhesiveness to the substrate, a silane coupling agent other than the silane compound having an oxirane ring in the molecule also as mentioned Component (A), such as vinyl triethoxysilane, 3-methacryl-oxypropyltrimethoxysilane, etc., or a titanium coupling agent may be formulated.

The cationically polymerizable resin composition according to the present invention can be easily prepared by mixing the respective components uniformly at normal temperature or under a slight heating of 40° C. or less, by using a mixing device such as a kneader, a stirrer-mixing machine, a three-rolls mill, etc. Said composition is stable at normal temperature and can be preserved for a long period of time, for example, 15 to 60 days or more, by optionally selecting Component (B) and Component (C) which act as catalysts.

The cationically polymerizable resin composition of the present invention can be cured by thermally or by photoirradiation, and either of the cases, it can be cured within a short period of time by heating or photoirradiation. In the case of thermal curing, a gel time is generally within 30 seconds at a temperature of 150° C., preferably 1 to 10 seconds. In the case of photocuring, the composition can be cured by using a light source such as a high-pressure mercury lamp, xenon lamp, etc., at an irradiation of 1,000 mJ or more. Also, after photoirradiation to make the resin semi-cured conditions, then the composition is thermally cured to obtain a completely cured product.

Accordingly, by using the composition of the present invention, an encapsulating layer can be formed and cured by encapsulating the resin composition so that electronic parts are sealed in a mold into which the electronic parts are placed and heating generally at 80 to 200° C., preferably 120 to 150° C. using a usual RIM injection molding device or a transfer molding machine. The curing time may be optionally set depending on the composition of the resins, dimension, shape and molding temperature of sealing materials, but the curing rate of the cationic polymerizable resin composition at the above-mentioned molding temperature is extremely rapid as mentioned above.

EXAMPLES

In the following, the present invention is explained in more detail by referring to Examples and Comparative examples. The present invention is not limited by these Examples. Also, in these Examples and Comparative Examples, "part" means "part by weight".

In Examples, the following are used as Component (A).
A-1: (3,4-Epoxycyclohexyl)methyl 3,4-epoxycyclohexylcarboxylate
A-2: p-Glycidylphenyldimethyltolyl bisphenol A glycidyl ether
A-3: Bisphenol F type epoxy resin
A-4: Tetrabromo bisphenol A type epoxy resin
A-5: 1,4-Bis[ethyl(3-oxetanyl)methoxymethyl]benzene
A-6: 3-Methyl-3-hydroxymethyloxetane
A-7: 1,3-Bis(3-glycidoxypropyl)-1,1,3,3-tetramethyldisiloxane
A-8: 2-(3,4-Epoxycyclohexyl)ethyltrimethoxysilane In Examples, the following are used as Component (B).
B-1: 4-Tolyl(4-cumyl)iodonium tetrakis(pentafluorophenyl) boron salt
B-2: Hexafluoroantimonate diphenyl(4-t-butylphenyl) sulfonium In Examples, the following are used as Component (C).
C-1: 1,1,3,3-Tetramethylbutyl peroxy 2-ethylhexanoate
C-2: t-Butylperoxy 2-ethylhexanoate
C-3: t-Butylperoxy benzoate
C-4: 1,1-Bis(t-butylperoxy)-3,3,5-trimethylcyclohexane Evaluation of the resulting resin compositions was carried out as mentioned below.

(1) Injecting property: On a glass-epoxy circuit substrate was placed levelly an injecting property measuring apparatus in which both sides and an upper portion thereof were partitioned with a glass plate and a gap with a width of 20 mm and a thickness of 50 μm was provided, and a temperature was set at 70° C. About 0.2 g of a resin composition at an uncured state was placed come into contact with one of inlets of the gap, and a length of said resin composition flown into the gap within 10 seconds was measured.

(2) Preservation stability (Pot life): A viscosity of a composition at 25° C. was measured and the composition was stored in a closed vessel at 25° C. A time when the viscosity becomes 1.2-times of the initial value was made pot life.

(3) pH and electroconductivity: A cured sample obtained by curing a resin composition was crushed and charged in a bottle made of polytetrafluoroethylene, and 20 ml of pure water was added to the sample and the mixture was heated in a pressure cooker testing apparatus at 121° C., 2 atom for 20 hours, and pH and electroconductivity of an extract were measured.

(4) Volume resistivity: A volume resistivity of a cured resin composition was measured and used as an initial value. Moreover, under the conditions of the above-mentioned pressure cooker test, a volume resistivity after heating in the presence of steam was measured.

(5) Humidity resistance: A resin composition to be tested was coated with a thickness of 70±10 μm onto an imitation device having a rectangular shape with a size of 5 mm×5 mm, having a daisy chain-shaped aluminum wiring between a semiconductor device and a terminal and the surface of which was subjected to passivation by silicon nitride, and after irradiating 1,000 mJ of UV rays, the material was heated at 150° C. for 10 minutes to prepare an imitation chip. This chip was allowed to stand in a thermostat at a temperature of 85° C. and a relative humidity of 85%, and a time until open was measured.

Examples 1 to 4

As shown in Table 1, resin compositions of Examples 1 to 4 in which an epoxy resin, an oxetane compound, an onium salt, magnesium oxide and respective organic peroxides were formulated were prepared. When gel times, at 150° C. of these resin compositions and storage stabilities at normal temperature thereof were measured, gel times are remarkably shortened while maintaining necessary storage stabilities by formulating organic peroxides as shown in Table 1.

Comparative Example 1

In the same manner as in Examples 1 to 4, a comparative resin composition in which no organic peroxide was formulated was prepared, and a gel time and storage stability thereof were similarly measured as in Examples 1 to 4. However, the gel time was not shortened as shown in Table 1.

TABLE 1

|  | Example | | | | Comparative example |
|---|---|---|---|---|---|
| Composition (parts) | 1 | 2 | 3 | 4 | 1 |
| A-1 | 43.0 | 43.0 | 43.0 | 43.0 | 43.0 |
| A-2 | 18.5 | 18.5 | 18.5 | 18.5 | 18.5 |
| A-5 | 38.5 | 38.5 | 38.5 | 38.5 | 38.5 |
| A-8 | 4.7 | 4.7 | 4.7 | 4.7 | 4.7 |
| B-1 | 2.0 | 2.0 | 2.0 | 2.0 | 2.0 |
| Magnesium oxide | 1.0 | 1.0 | 1.0 | 1.0 | 1.0 |
| C-1 | 0.08 | — | — | — | — |
| C-2 | — | 0.08 | — | — | — |
| C-3 | — | — | 0.16 | — | — |
| C-4 | — | — | — | 0.16 | — |
| Gel time [s] (150° C.) | 5 | 7 | 17 | 11 | 45 |
| Storage stability [day] | >7 | >7 | >7 | >7 | >7 |

Examples 5 to 8

Paste-state resin compositions having the composition shown in Table 2 were prepared. With regard to these resin compositions, viscosities and injection properties were measured. Also, gel times and storage stabilities were measured in the same manner as in Examples 1 to 4. These results are as shown in Table 2.

Moreover, these resin compositions were coated on the surface of a glass substrate with a thickness of 200 μm. and after irradiating UV rays with a total irradiation dose of 1,000 mJ, these materials were heated at 150° C. for 10 minutes to obtain completely cured compositions. Physical properties of the cured resin compositions are as shown in Table 2.

Comparative Examples 2 to 5

In the same manner as in Examples 5 to 8, paste state resin compositions were prepared. Incidentally, Comparative examples 2 to 5 are samples each of which correspond to Examples 5 to 8, respectively, to which no organic peroxide is formulated. With regard to these resin compositions, viscosities and injection properties were measured. These results are as shown in Table 2.

Moreover, these resin compositions were coated on the surface of a glass substrate with a thickness of 200 μm, and after irradiating UV rays with a total irradiation dose of 3,000 mJ, these materials were heated at 150° C. for 30 minutes to obtain completely cured compositions since these compositions could not provide sufficiently cured film under the same conditions as in Examples 5 to 8. Physical properties of the cured resin compositions are as shown in Table 2.

TABLE 2

| | Example | | | | Comparative example | | | |
|---|---|---|---|---|---|---|---|---|
| | 5 | 6 | 7 | 8 | 2 | 3 | 4 | 5 |
| Composition (parts) | | | | | | | | |
| A-1 | 14.6 | 14.6 | 7.3 | 14.6 | 14.6 | 14.6 | 7.3 | 14.6 |
| A-2 | 7.0 | 7.0 | 8.0 | 7.0 | 7.0 | 7.0 | 8.0 | 7.0 |
| A-5 | 14.6 | 7.3 | 8.4 | 7.3 | 14.6 | 7.3 | 8.4 | 7.3 |
| A-6 | — | 7.3 | 8.4 | 7.3 | — | 7.3 | 8.4 | 7.3 |
| A-7 | — | — | — | 5.1 | — | — | — | 5.1 |
| A-8 | 1.9 | 1.9 | 1.9 | 1.9 | 1.9 | 1.9 | 1.9 | 1.9 |
| B-1 | 0.3 | 0.3 | 0.3 | 0.3 | 0.3 | 0.3 | 0.3 | 0.3 |
| Calcium carbonate | 0.3 | 0.3 | 0.3 | 0.3 | 0.3 | 0.3 | 0.3 | 0.3 |
| Fused silica | 60.0 | 60.0 | 55.0 | 55.0 | 60.0 | 60.0 | 55.0 | 55.0 |
| Carbon black | 0.1 | 0.1 | 0.1 | 0.1 | 0.1 | 0.1 | 0.1 | 0.1 |
| C-4 | 0.03 | 0.03 | 0.03 | 0.03 | — | — | — | — |
| Sensitizer*1 | 0.1 | 0.1 | 0.1 | 0.1 | 0.1 | 0.1 | 0.1 | 0.1 |
| Uncured physical property/thermal curing property | | | | | | | | |
| Viscosity*2 (25° C.) [Pa·s] | 7 | 6 | 2 | 3 | 7 | 6 | 2 | 3 |
| Gel time (150° C.) [s] | 12 | 12 | 13 | 15 | 52 | 62 | 65 | 60 |
| Storage stability (day) | >7 | >7 | >7 | >7 | >7 | >7 | >7 | >7 |
| Injecting property | 5.4 | 8.0 | 9.0 | 13.0 | 5.4 | 8.0 | 9.0 | 13.0 |
| Curing conditions | 1,000 mJ + 150° C., 10 min | | | | 3000 mJ + 150° C., 30 min | | | |
| Physical property after curing | | | | | | | | |
| Tg (TMA) *3 [° C.] | 130 | 140 | 105 | 100 | 130 | 140 | 105 | 100 |
| (DMA) *4 [° C.] | 200 | 180 | 180 | 180 | 200 | 180 | 180 | 180 |
| pH | 6.7 | 7.0 | 7.0 | 7.0 | 6.7 | 7.0 | 7.0 | 7.0 |
| Electroconductivity [μS/cm] | 140 | 80 | 85 | 83 | 137 | 83 | 84 | 82 |
| Volume resistivity [Ω·cm] | | | | | | | | |
| Initial | $7 \times 10^{15}$ | $2 \times 10^{15}$ | $2 \times 10^{15}$ | $1 \times 10^{15}$ | $7 \times 10^{15}$ | $2 \times 10^{15}$ | $2 \times 10^{15}$ | $1 \times 10^{15}$ |
| PCT*5 | $3 \times 10^{13}$ | $2 \times 10^{13}$ | $2 \times 10^{13}$ | $2 \times 10^{14}$ | $3 \times 10^{13}$ | $2 \times 10^{13}$ | $2 \times 10^{13}$ | $2 \times 10^{14}$ |

(Note)
*1: 4,4'-Bis(diethylamino)benzophenone
*2: Brookfield rotary index meter, 100 rpm
*3: Thermal machine method
*4: Damped oscillation method
*5: After pressure cooker test Examples 9 to 12

Paste-state resin compositions as shown in Table 3 were prepared. Incidentally, Example 12 is a resin composition in which a brominated bisphenol A type epoxy resin and antimony trioxide were formulated, which provides a flame retardant cured product.

With regard to these resin compositions, viscosities and storage stabilites were measured in the same manner as in Examples,5 to 8, and gel times at 120° C. were also measured. The results are as shown in Table 3.

Also, these resin compositions were each coated on a polytetrafluoroethylene substrate so that a film thickness after curing becomes 1 mm, air-dried and heated at a temperature of 150° C. for 30 minutes to obtain cured films. Physical properties of the resulting films are as shown in Table 3.

Comparative Examples 6 to 8

Paste-state resin compositions as shown in Table 3 were prepared in the same manner as in Examples 9 to 12. Incidentally, Comparative example 6 is a sample in which fused silica was used in place of an alkaline filler of Example 9, Comparative example 7 is a sample in which no organic peroxide of Example 9 was formulated, and Comparative example 8 is a sample in which no alkaline filler of Example 12 was formulated.

With regard to these resin compositions, viscosities and storage stabilites were measured in the same manner as in Examples 5 to 8, and gel times at 120° C. were also measured. The results are as shown in Table 3. Also, these resin compositions were each coated on a polytetrafluoroethylene substrate so that a film thickness after curing becomes 1 mm, air-dried and heated at a temperature of 150° C. for 30 minutes to obtain cured films. Physical properties of the resulting films are as shown in Table 3.

Incidentally, cured products of the resin compositions of Example 12 and Comparative example 8 obtained by heating at 150° C. for 60 minutes showed evaluated values of 94V-0 according to the flame retardant test of UL94, and no difference between flame retardancy was admitted therebetween.

TABLE 3

|  | Example | | | | Comparative example | | |
|---|---|---|---|---|---|---|---|
|  | 9 | 10 | 11 | 12 | 6 | 7 | 8 |
| Composition (parts) | | | | | | | |
| A-1 | 25.0 | 25.0 | 50.0 | 25.0 | 25.0 | 25.0 | 25.0 |
| A-3 | 75.0 | — | — | 45.0 | 75.0 | 75.0 | 45.0 |
| A-4 | — | — | — | 30.0 | — | — | 30.0 |
| A-5 | — | 75.0 | 50.0 | — | — | — | — |
| Calcium carbonate | 25.0 | — | 25.0 | 25.0 | — | 25.0 | — |
| Magnesium oxide | — | 25.0 | — | — | — | — | — |
| Fused silica | — | — | 214.0 | 214.0 | 25.0 | — | 214.0 |
| Carbon black | 0.7 | 0.7 | 0.7 | 0.7 | 0.7 | 0.7 | 0.7 |
| Antimony trioxide | — | — | — | 12.5 | — | — | 12.5 |
| B-1 | 3.5 | — | 3.5 | 3.5 | 3.5 | 3.5 | 3.5 |
| B-2 | — | 3.5 | — | — | — | — | — |
| C-4 | 0.08 | 0.08 | 0.08 | 0.08 | 0.08 | — | 0.08 |
| Ethylene glycol monobutyl ether | 3.5 | 3.5 | 18.0 | 18.0 | 3.5 | 3.5 | 18.0 |
| Uncured physical property/ thermal curing property | | | | | | | |
| Viscosity*2 (25° C.) [Pa·s] | 15 | 15 | 30 | 55 | 15 | 15 | 55 |
| Gel time (150° C.) [s] | 7 | 8 | 7 | 12 | 7 | 40 | 12 |
| Storage stability (day) | >7 | >7 | >7 | >7 | >7 | >7 | >7 |
| Physical property after curing | | | | | | | |
| Tg (TMA) *3 [° C.] | 120 | 115 | 128 | 105 | 120 | 115 | 128 |
| pH | 7.0 | 7.0 | 7.0 | 7.0 | 5.5 | 6.7 | 5.5 |
| Electroconductivity [μS/cm] | 100 | 100 | 100 | 100 | 600 | 100 | 700 |
| Volume resistivity [Ω·cm] | | | | | | | |
| Initial | $2 \times 10^{15}$ | $2 \times 10^{15}$ | $2 \times 10^{15}$ | $2 \times 10^{15}$ | $2 \times 10^{15}$ | $2 \times 10^{15}$ | $2 \times 10^{15}$ |
| PCT*5 | $3 \times 10^{13}$ | $3 \times 10^{13}$ | $3 \times 10^{13}$ | $8 \times 10^{12}$ | $3 \times 10^{13}$ | $3 \times 10^{13}$ | $2 \times 10^{12}$ |

(Note)
*2, *3 and *5: Same as in Table 2

Examples 13 to 15

Paste-state resin compositions shown in Table 4 were prepared. By using said resin compositions, encapsulating layers were formed under the sample preparing conditions of the above-mentioned humidity resistance test. By using the thus prepared imitation chips, humidity resistance of these samples were evaluated under the same conditions as mentioned above. The results are as shown in Table 4.

Comparative Examples 9 and 10

In the same manner as in Examples 13 to 15, paste-state resin compositions shown in Table 4 were prepared. By using said resin compositions, encapsulating layers were formed under the sample preparing conditions of the above-mentioned humidity resistance test. By using the thus prepared imitation chips, humidity resistance of these samples were evaluated under the same conditions as mentioned above. The results are as shown in Table 4.

As can be seen from the results shown in Table 4, according to the resin compositions of the present invention, encapsulating layers having excellent humidity resistance can be formed as compared with the resin compositions containing no alkaline filler or organic peroxide.

TABLE 4

|  | Example | | | Comparative example | |
|---|---|---|---|---|---|
|  | 12 | 13 | 14 | 9 | 10 |
| Composition (parts) | | | | | |
| A-1 | 22 | 40 | 22 | 22 | 40 |
| A-2 | — | 20 | 25 | — | 20 |
| A-3 | 8 | — | — | 8 | — |
| A-5 | 5 | 40 | 25 | 5 | 40 |
| A-6 | 7.5 | — | 25 | 7.5 | |
| A-8 | 2.5 | 5 | 5 | 2.5 | 5 |
| Fused silica | 165 | 120 | 120 | 165 | 120 |
| Calcium carbonate | 0.5 | 0.8 | 0.8 | — | 0.8 |

TABLE 4-continued

|  | Example | | | Comparative example | |
|---|---|---|---|---|---|
|  | 12 | 13 | 14 | 9 | 10 |
| B-1 | 0.5 | 0.8 | 0.8 | 0.5 | 0.8 |
| C-4 | 0.1 | 0.1 | 0.1 | 0.1 | — |
| Sensitizer*1 | 0.3 | 0.3 | 0.3 | 0.3 | 0.3 |
| Curing conditions | | 1,000 mJ + 150° C., 10 min | | | |
| Humidity resistance (h) | >500 | >500 | >400 | <50 | <100 |

(Note)
*1: 4,4-Bis(diethylamino)benzophenone

Examples 16 and 17

Paste-state resin compositions were prepared with the same compositions as in Examples 12 and 13 except for formulating a sensitizer. By using the resin compositions, encapsulating layers were formed by the same manner as the sample forming method of the humidity resistance test except for not carrying out UV irradiation and carrying out heating at 150° C. for 10 minutes. By using the imitation chips thus prepared, humidity resistance of these samples were evaluated under the same conditions as mentioned above. As a result, each showed humidity resistance exceeding 500 hours.

According to the present invention, a cationic polymerizable resin composition which is excellent in storage stability, cures by heating or photoirradiation with a short period of time and does not occur increase in electroconductivity of extracted water or corrosion of the parts thereby can be obtained. The resin composition of the present invention can be widely applied to a semiconductor device such as a diode, transistor, IC, LSI, VLSI, etc. or encapsulation or insulation of the device containing the same.

What is claimed is:

1. A cationically polymerizable resin composition which comprises (A) a compound containing at least one ring selected from the group consisting of an oxirane ring and an oxetane ring, said compound being selected from the group consisting of a bisphenol A epoxy resin having an average molecular weight of 400 or less, p-glycidylphenyldimethyltolyl bisphenol A glycidyl ether, a bisphenol F epoxy resin., a phenol novolak epoxy resin having an average molecular weight of 570 or less, vinyl(3,4-cyclohexene)dioxide, (3,4-epoxycyclohexyl)methyl 3,4-epoxycyclohexylcarboxylate, bis(3,4epoxy-6-methylcyclohexylmethyl)adipate, 2-(3,4-epoxycyclohexyl)5,1-spiro(3,4-epoxycyclohexyl)-m-dioxane, diglycidyl hexahydrophthalate, diglycidyl 3-methylhexahydrophthalate, diglycidyl hexahydroterephthalate, diglycidylaniline, diglycidyltoluidine, triglycidyl-p-aminophenol, tetraglycidyl-m-xylylene diamine, tetraglycidyl-bis(aminomethyl)cyclohexane, 1,3-diglycidyl-5-methyl-5-ethylhydantoin, n-butyl glycidyl ether, 2-ethylhexyl glycidyl ether, phenyl glycidyl ether, cresyl glycidyl ether, p-s-butylphenyl glycidyl ether, styrene oxide, α-pinene oxide, allyl glycidyl ether, glycidyl methacrylate, 1-vinyl-3,4-epoxycyclohexane, (poly)ethyleneglycol diglycidyl ether, (poly)propyleneglycol diglycidyl ether, butanediol glycidyl ether, neopentylglycol diglycidyl ether, trimethylolpropane triglycidyl ether, glycerin triglycidyl ether, 3-glycidoxypropyl trimethoxysilane, 3-glycidoxypropyl(methyl) dimethoxy silane, 2-(3,4-epoxycyclohexyl) ethyltrimethoxy silane, 2-(3,4-epoxycyclohexyl)ethyl (methyl)dimethoxy silane, 1,3-bis(3-glycidoxypropyl)-1,1,3,3-tetramethyldisiloxane, 3-ethyl-3-hydroxymethyloxetane, 3-ethyl-3-hexyloxymethyloxetane, 3-ethyl-3-allyloxymethyloxetane, 3-ethyl-3-benzyloxymethyloxetane, 3-ethyl-3-methacryloxymethyloxetane, 3-ethyl-3-carboxyloxetane, bis-{[ethyl(3-oxetanyl)] methyl}ether, 1,4-bis[ethyl(3-oxetanyl) methoxymethyl]benzene, bis{[ethyl(3-oxetanyl)] methyl}carbonate, bis{[ethyl(3-oxetanyl)] ethyl}adipate, bis{[ethyl(3-oxetanyl)] methyl}terephthalate, bis{[ethyl(3-oxetanyl)]methyl}-1,4-cyclohexanecarboxylate, bis{4-[ethyl(3-oxetanyl) methoxycarbonylamino]phenyl}methane, α,ω-bis-{3-[1-ethyl(3-oxetanyl)methoxy]propyl (polydimethylsiloxane) and oligo(glycidyloxetane-co-phenylglycidyl ether);

(B) at least one onium salt in an amount of 2 to 8 parts by weight based on 100 parts by weight of (A), said onium salt being selected from the group consisting of an iodonium salt, a sulfonium salt, an ammonium salt, a phosphonium salt, a diazonium salt and a pyridinium salt of the following formula:

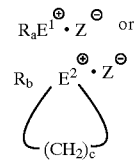

wherein

R is the same or different and is a straight or branched alkyl group having 1 to 15 carbon atoms, a cycloalkyl group having 3 to 10 carbon atoms, said cycloalkyl group being unsubstituted or substituted by an alkyl group having 1 to 15 carbon atoms, an aryl group having 6 to 20 carbon atoms, an aralkyl group having 7 to 20 carbon atoms, an alkenyl group having 2 to 10 carbon atoms or a monovalent substituted hydrocarbon group selected from the group consisting of 4-hydroxyphenyl, 4-methoxyphenyl, 4-ethoxyphenyl, 4-cyanophenyl, 4-chlorophenyl, 4-acetoxyphenyl, 4-propanoylphenyl, 4-methoxycarbonylphenyl, 4-ethoxycarbonylphenyl, 4-methoxybenzyl, 4-ethoxybenzyl, 4-t-butoxybenzyl, 4-nitrobenzyl and 4-cyanobenzyl, $E^1$ is an iodine atom, a sulfur atom, a nitrogen atom, a phosphorus atom, a diazo group or an unsubstituted or ring-substituted pyridinio group, $E^2$ is a sulfur atom or a nitrogen atom, Z is a zwitter ion which is $BF_4$, $PF_4$, $AsF_6$, $SbF_6$ or $(C_6H_5)_4B$, a is 2 when $E^1$ is an iodine atom, a is 3 when $E^1$ is a sulfur atom, a is 4 when $E^1$ is a nitrogen atom or a phosphorus atom, or a is 1 when $E^1$ is a diazo group or an unsubstituted or ring-substituted pyridinio group, b is 1 when $E^2$ is a sulfur atom or b is 2 when $E^2$ is a nitrogen atom, and c is 4 or 5;

(C) an organic peroxide in an amount of 0.01 to 1 part by weight based on 100 parts by weight of (A); and (D) an alkaline filler except for a hydroxide, said alkaline filler being in an amount of 5 to 15 fold of the amount of (B).

2. The composition according to claim 1, wherein (A) is a liquid state at normal temperature.

3. The composition according to claim 2, wherein (A) exhibits fluidity at a temperature of 25 to 40° C.

4. The composition according to claim 1, wherein Component (B) is a salt of $B(C_6H_5)_4$.

5. The composition according to claim 1, wherein Component (C) is a dialkylperoxide, a peroxyketal or an alkylperoxy ester.

6. The composition according to claim 1, wherein Component (D) is a filler selected from the group consisting of calcium carbonate, magnesium oxide and zinc oxide.

7. The composition according to claim 1, wherein the composition further comprises Component (E) a neutral or alkaline colorant.

8. The composition according to claim 1, wherein (B) is the pyridinium salt.

9. The composition according to claim 8, wherein R is selected from the group consisting of methyl, ethyl, propyl, butyl, pentyl, octyl, decyl, dodecyl, tetradecyl, cyclohexyl, phenyl, 4-tolyl, 2,4-xylyl, 1-naphthyl, benzyl, 2-methylbenzyl, 4-methylbenzyl, 2-phenylethyl, 1-naphthylmethyl, vinyl, allyl and butenyl; and E is 2-methylpyridinio, 4-methylpyridinio, 2,4-dimethylpyridinio, 2-cyanopyridinio, 4-cyanopyridinio, 2-methoxycarbonylpyridinio, 4-methoxycarbonylpyridinio, 2-ethoxycarbonylpyridinio and 4-ethoxycarbonylpyridinio.

10. The composition according to claim 1, wherein (B) is at least one onium salt which is a hexafluoroantimonate salt or a tetrakis(pentafluorophenyl)boron, of diphenyl iodonium, phenyl(4-tolyl)iodonium, phenyl(4-cumyl) iodonium, phenyl(4-t-butylphenyl)iodonium, di(4-tolyl) iodonium, 4-tolyl(4-cumyl)iodonium, 4-tolyl(4-t-butylphenyl)iodonium, di(4-cumyl)iodonium, 4-cumyl(4-t-butylphenyl)iodonium, di(4-t-butylphenyl)iodonium, phenyl(4-methoxyphenyl)iodonium, bis(4-methoxyphenyl) iodonium, phenylbenzyl iodonium, triphenyl sulfonium, diphenyl(4-t-butylphenyl)sulfonium, tritolyl sulfonium, tris(4-hydroxy-phenyl)sulfonium, tris(4methoxyphenyl) sulfonium, tris(4-ethoxyphenyl)sulfonium, tris (acetoxyphenyl)sulfonium, methyl(4-hydroxyphenyl)benzyl sulfonium or methyl(4-methoxyphenyl)-1-naphthylmethyl sulfonium.

11. The composition according to claim 10, wherein (C) is an organic peroxide selected from the group consisting of dicumyl peroxide, t-butylcumyl peroxide, 1,3-bis(2-t-butylperoxyisopropyl)benzene, 2,5-dimethyl-2,5-bis(t-butylperoxy)hexane, 1,1-bis-(t-butylperoxy)cyclohexane, 1,1-bis(t-butylperoxy)-3,3,5-trimethylcyclohexane, 1,1-bis (t-amylperoxy)cyclohexane, 2,2-bis(t-butylperoxy)butane, n-butyl 4,4-bis(t-butylperoxy)valerate, ethyl 3,3-(t-butylperoxy)butyrate, 1,1,3,3-tetramethylbutylperoxy 2-ethylhexanoate, t-butylperoxy-2-ethyl hexanoate, t-butylperoxy isobutyrate, t-butylperoxy maleate and t-butylperoxy benzoate.

12. The composition according to claim 11, wherein (D) is selected from the group consisting of calcium carbonate, magnesium oxide, zinc oxide, silicon dioxide, titanium oxide and aluminum oxide.

13. The composition according to claim 12, which further comprises 0.1 to 10 parts by weight of (E) a neutral or alkaline colorant based on 100 parts by weight of (A).

14. The composition according to claim 13, wherein (E) is at least one colorant selected from the group consisting of carbon black, black lead oxide, a Cr—Cu complex oxide, a complex oxide of Cu—Fe—Mn, red iron oxide, cobalt blue, a chromophthal colorant, a quinacridone colorant and a phthalocyanine pigment.

15. The composition according to claim 1, wherein the alkaline filler is a filler in which an extract solution extracted with pure water results in a pH of. 7 to 10.

* * * * *